(12) United States Patent
Furuya

(10) Patent No.: US 7,916,611 B2
(45) Date of Patent: Mar. 29, 2011

(54) OPTICAL PICKUP APPARATUS

(75) Inventor: Takaaki Furuya, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 337 days.

(21) Appl. No.: 12/171,973

(22) Filed: Jul. 11, 2008

(65) Prior Publication Data
US 2009/0016193 A1    Jan. 15, 2009

(30) Foreign Application Priority Data

Jul. 12, 2007  (JP) ................................. 2007-183525

(51) Int. Cl.
G11B 7/00 (2006.01)
(52) U.S. Cl. ........... 369/112.01; 369/112.22; 369/44.24; 369/44.41
(58) Field of Classification Search .................. None
See application file for complete search history.

(56) References Cited

U.S. PATENT DOCUMENTS

| | | | |
|---|---|---|---|
| 6,275,463 B1 | 8/2001 | Nagata et al. | |
| 7,800,986 B2 * | 9/2010 | Kobayashi et al. | ........ 369/44.24 |
| 2009/0238051 A1 | 9/2009 | Nishiwaki et al. | |

FOREIGN PATENT DOCUMENTS

| | | |
|---|---|---|
| JP | 2-126429 | 5/1990 |
| JP | 11-513835 | 11/1999 |
| JP | 2003-203368 A | 7/2003 |
| WO | WO-2007/046207 | 4/2007 |

* cited by examiner

Primary Examiner — Muhammad N Edun
(74) Attorney, Agent, or Firm — Morrison & Foerster LLP

(57) ABSTRACT

A light blocking unit includes a plate-like member which is different from a housing member, and a light blocking portion formed on the plate-like member, for blocking light. A light detector has a light receiving portion for receiving light which is partitioned into four divided regions, by a Y-axis-wise parting line and an X-axis-wise parting line in X-Y coordinates, and outputs photoelectric output signals for the respective divided regions in accordance with intensity of the light received by the respective divided regions of the light receiving portion. Of light beams emitted from a polarization beam splitter, a part of the light beams are blocked by the light blocking unit while the other part of the light beams are not blocked and thus emitted to the light detector excluding a region defined by two sides parallel to the parting lines.

10 Claims, 9 Drawing Sheets

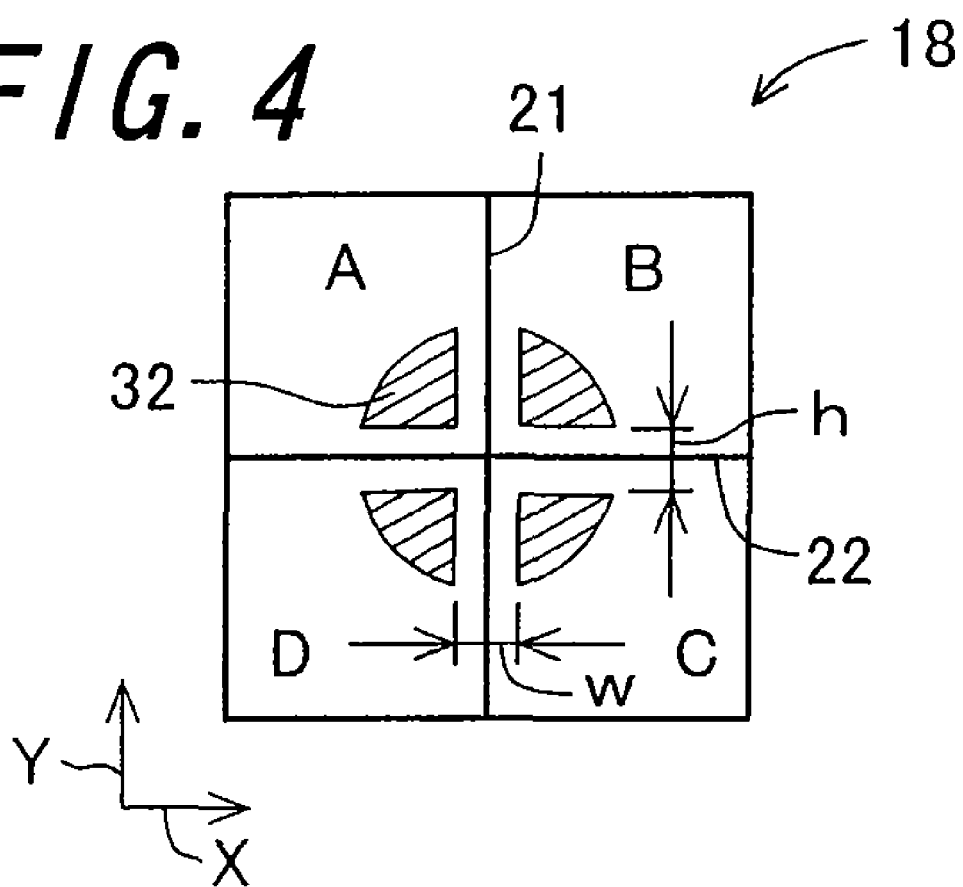

OPTICAL PICKUP APPARATUS

CROSS-REFERENCE TO RELATED APPLICATION

This application claims priority to Japanese Patent Application No. 2007-183525, which was filed on Jul. 12, 2007, the contents of which are incorporated herein by reference in its entirety.

BACKGROUND OF THE INVENTION

1. Field of the Invention

The present invention relates to an optical pickup apparatus capable of optically recording, reproducing, and deleting information on an information recording medium such as an optical disk.

2. Description of the Related Art

FIG. 11 is a view showing a configuration of an optical pickup apparatus 9 according to a first related art. FIG. 12 is a view showing a light beam-irradiated area 39 on a light detector 98 of the optical pickup apparatus 9. FIGS. 13A and 13B are graphs each showing a relation between displacement and beam quantity balance of the light detector 98.

The optical pickup apparatus 9 includes a laser element 91 for generating a light beam; a polarization beam splitter 92 composed of two right angle prisms that are bonded to each other on total reflection surfaces, either of which surfaces is coated with a polarizing film; a quarter-wave plate 93 formed of an optically anisotropic body, through which two mutually orthogonal polarization components of the light beam being transmitted become different in phase by a quarter of a wavelength of the light beam; a lens 94 through which the light beam transmitted by the quarter-wave plate 93 is converted into a light beam of collimated light; an objective lens 95 through which the light beam emitted by the lens 94 converges; a cylindrical lens 97 which causes astigmatism; and the light detector 98 for converting received light beam into an electric signal. As a recording medium 96, a disc-shaped recording medium is used which optically records and reproduces information.

The light detector 98 has a light receiving portion for receiving light which is partitioned into four divided regions A to D, by an X-axis-wise parting line 81 and a Y-axis-wise parting line 82 in X-Y coordinates. Light is received by the respective divided regions of the light receiving portion, and photoelectric output signals SA to SD are outputted for the respective divided regions in accordance with intensity of the light. A position of the light detector 98 is adjusted so that the outputted photoelectric output signals SA to SD for the respective divided regions of the light receiving portion are equal to each other when the light beams equal in intensity are emitted to the respective divided regions of the light receiving portion in the light beam-irradiated area 39 on the light detector 98. In such a position as above, the light detector 98 is fixed with adhesive, for example, to a housing for supporting the light detector 98.

As a second related art, a focal error detecting device has been disclosed which uses not the astigmatic method but the knife-edge method. In the focal error detecting device, a light detector is partitioned by three parallel parting lines and thus composed of four light receiving elements, and provided with a light blocking means for blocking first-order diffracted light contained in a light beam which has been reflected by a recording medium and is entering the light receiving elements. Owing to the light blocking portion for blocking the first-order diffracted light contained in the light beam which has been reflected by the recording medium and is entering the light receiving elements, a focal error can be detected without influences of the first-order diffracted light beam which is used for detection of tracking errors (refer to Japanese Unexamined Patent Publication JP-A 2-126429 (1990), for example).

As a third related art, an optical head has been disclosed. In the optical head, a light receiving means receives a plurality of light beams split by a first parting line and at least one light blocking region located symmetrically on either side of the first parting line. The first parting line is parallel to a direction optically corresponding to an information track. The light blocking region preferably blocks a part of reflected light beams of overlapped zero-order diffracted light and first-order diffracted light diffracted by the information track. A part of the light beams exhibiting a light intensity distribution highly influenced by inclination of an optical disk is thus removed by the light-blocking region, and a plurality of the reflected light beams are split when received. As a result, it is possible to reduce the offset of tracking error signals attributable to the inclination of the optical disk (refer to Japanese Unexamined Patent Publication JP-A 11-513835 (1999), for example).

In the first related art, a change in ambient temperature, physical impact, or the like matter may cause a positional shift of the light detector 98 fixed to the housing, etc. The positional shift of the light detector 98 induces a change in the light intensity balance. The graph of FIG. 13A shows a change of the light intensity balance relative to X-axis-wise displacement, represented by the expression $\{(SA+SD)-(SB+SC)\}/(SA+SB+SC+SD)$. The graph of FIG. 13B shows a change of the light intensity balance relative to Y-axis-wise displacement, represented by the expression $\{(SA+SB)-(SC+SD)\}/(SA+SB+SC+SD)$.

That is to say, the light intensity balance is substantially proportional to the displacement of the light detector 98 and therefore, the positional shift of the light detector 98 increases or decreases the light beam-irradiated area on the light receiving portion of each region, thus causing a problem that the photoelectric output signals SA to SD undesirably change and thus no longer have those adjusted values which are equal to each other. The change of the photoelectric output signals SA to SD leads to breakdown of such a relation that photoelectric output signals SA to SD are equal to each other, resulting in a failure to fall within a desired error range to be detected and thus causing a decrease in controllability.

Also in the second and third related arts, the relation between the change in the light intensity balance and the displacement, of the light detector or light receiving means, is similar to that shown in the graph of FIG. 13B. That is to say, there arises a problem that the shift of the light detector or light receiving means causes the change in output of the light detector or light receiving means, resulting in a failure to achieve the desired error detection.

SUMMARY OF THE INVENTION

An object of the invention is to provide an optical pickup apparatus having a light detector where output signals of the light detector in motion are changing to a lesser extent.

The invention provides an optical pickup apparatus comprising:

a light source for emitting a light beam;

a light receiving unit having a light receiving portion which is partitioned into at least two divided regions, for receiving the light beam emitted, the light receiving unit outputting an output signal of each of the regions in accordance with intensity of the light beam received by the respective divided regions of the light receiving portion;

an optical unit for converging the light beam emitted from the light source onto a recording medium on which information is to be recorded, the optical unit further converging a light beam reflected by the recording medium onto the light receiving portion of the light receiving unit; and a light blocking unit for blocking, of the light beam being converged on the light receiving portion through the optical unit, a light beam being converged in a predetermined range including at least a part of a boundary line formed by adjacent regions of the at least two divided regions.

According to the invention, a light source emits a light beam, and a light receiving unit including a light receiving portion which is partitioned into at least two divided regions, for receiving the light beam emitted, outputs an output signal of each of the divided regions in accordance with intensity of the light received by the respective divided regions of the light receiving portion.

And by way of an optical unit, the light beam emitted from the light source is converged on a recording medium on which information is to be recorded, and the light beam reflected by the recording medium is converged on the light receiving portion in the light receiving unit. Of the light beams being converged on the light receiving portion by way of the optical unit, the light beam is blocked by a light blocking unit blocks which light beam is converged in a predetermined range including at least a part of a boundary line formed by adjacent divided regions of the above divided regions of which number is at least two.

Accordingly, the intensity of the light beam emitted to the respective divided regions of the light receiving portion does not change as long as the displacement of the light receiving unit, e.g., a light detector, falls within the predetermined range, with the result that a change can be smaller in the output signal of the light detector in motion. That is to say, a region can be provided where the light intensity does not change even when the light detector moves, therefore allowing for higher tolerance to the shift of the light detector caused by a change in ambient temperature, physical impact, or the like matter, and allowing for higher reliability of an optical pickup apparatus.

Further, in the invention, it is preferable that the light receiving portion is formed of a plurality of light receiving elements corresponding to the respective divided regions.

Further, in the invention, it is preferable that the boundary line is a straight line, and the predetermined range is defined by two sides parallel to the boundary line.

Further, in the invention, it is preferable that the boundary line includes at least two straight lines orthogonal to each other, and the predetermined range has a cross shape defined by two sides parallel to the straight lines orthogonal to each other.

Further, in the invention, it is preferable that the following expression is satisfied under a condition of $\delta < w/2$:

$$\{\pi r^2 \cdot \sin^{-1}(\delta/r)/90 + 2\delta \cdot (r^2 - \delta^2)^{1/2}\}/(\pi r^2) = 0$$

where "r" represents a radius of the light beam being converged on the light receiving portion by the optical unit, "$\delta$" represents a distance between a center of the light beam being converged and the boundary line, and "w" represents a minimum width orthogonal to the boundary line, of the predetermined range.

Further, in the invention, it is preferable that the light blocking unit comprises:

a plate-like member having a predetermined thickness, the plate-like member being different from a housing member which supports the light source, the light receiving unit, the optical unit, and the light blocking unit; and a light blocking portion formed on the plate-like member, for blocking light.

Further, in the invention, it is preferable that the light blocking unit comprises:

a protrusion formed integratedly with a housing member which supports the light source, the light receiving unit, and the optical unit; and a light blocking portion formed in the protrusion, for blocking light.

Further, in the invention, it is preferable that the optical unit comprises a light beam splitting unit for splitting a light beam reflected by a recording medium, the housing member comprises a positioning protrusion which supports the light beam splitting unit at a fixed position, and the light blocking unit comprises a light blocking portion formed in the positioning protrusion, for blocking light.

Further, in the invention, it is preferable that the optical unit comprises a light beam splitting unit for splitting a light beam reflected by a recording medium, and the light blocking unit comprises a light blocking portion formed in the light beam splitting unit, for blocking light.

Further, in the invention, it is preferable that the optical unit comprises a cylindrical lens, and the light blocking unit comprises a light blocking portion formed in the cylindrical lens, for blocking light.

Further, in the invention, it is preferable that the light blocking portion is formed of a vacuum-deposited metal film.

BRIEF DESCRIPTION OF THE DRAWINGS

Other and further objects, features, and advantages of the invention will be more explicit from the following detailed description taken with reference to the drawings wherein:

FIG. 4 is a view showing the second light beam-irradiated area on the light detector;

DETAILED DESCRIPTION

Figure 1:
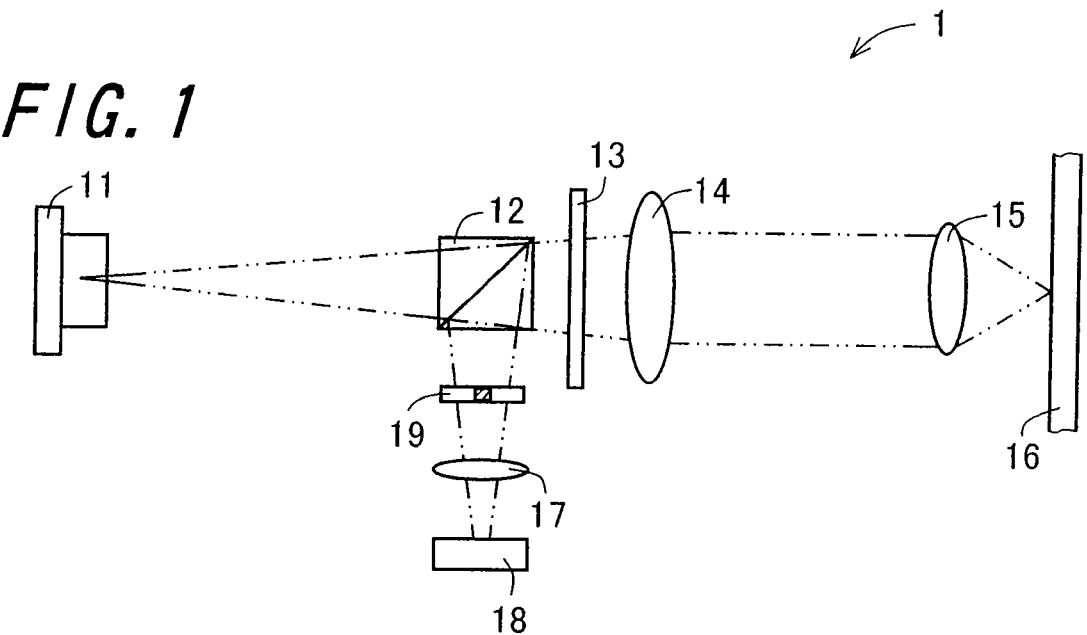
FIG. 1 is a view showing a configuration of an optical pickup apparatus according to a first embodiment of the invention.

Now referring to the drawings, preferred embodiments of the invention are described below.

FIG. 1 is a view showing a configuration of an optical pickup apparatus 1 according to a first embodiment of the invention. The optical pickup apparatus 1 includes a laser element 11, a polarization beam splitter 12, a quarter-wave plate 13, a lens 14, an objective lens 15, a cylindrical lens 17, a light detector 18, and a light blocking unit 19. The laser element 11, the polarization beam splitter 12, the quarter-wave plate 13, the lens 14, the objective lens 15, the cylindrical lens 17, the light detector 18, and the light blocking unit 19 are supported by a housing member (not shown).

The laser element 11 as a light source emits a light beam. The polarization beam splitter 12 as a light beam splitting unit is composed of two right angle prisms that are bonded to each other on total reflection surfaces, either of which surfaces is coated with a polarizing film. In the polarization beam splitter 12, the light beam emitted from the laser element 11 is transmitted and then emitted while the light beam reflected by a recording medium 16 is reflected by the total reflection surface and deflected at 90 degrees.

Through the quarter-wave plate 13 which is formed of an optically anisotropic body, two mutually orthogonal polarization components of an incident light beam become different in phase by a quarter of a wavelength of the light beam. The quarter-wave plate 13 thus converts a direction of polarization of the light beam reflected by the recording medium 16 into a direction of polarization different in angle by 90 degrees from that of the light beam emitted from the laser element 11.

Through the lens 14, the light beam emitted from the quarter-wave plate 13 is converted into a light beam of collimated light, and the collimated light emitted from the objective lens 15 is converged on the light detector 18. Through the objective lens 15, the collimated light emitted from the lens 14 is converged on the recording medium 16, and the light beam reflected by the recording medium 16 is converted into the light beam of collimated light. The recording medium 16 is a recording medium for optically recording and reproducing information. The recording medium 16 is, for example, in form of an optical disk such as CD (compact disk) or DVD (digital versatile disk).

The cylindrical lens 17 is a lens for causing astigmatism and transmits the light beam emitted from the polarization beam splitter 12. The light detector 18 as a light receiving unit has a light receiving portion which is partitioned into four divided regions, for receiving light, and outputs photoelectric output signals for the respective divided regions in accordance with intensity of the light received by the respective divided regions.

The light blocking unit 19 includes: a plate-like member which transmits light and is different from the housing member; and a light blocking portion formed on the plate-like member, for blocking light. A thickness of the plate-like member is 0.3 mm, for example. The light blocking portion 19 blocks a part of the light beams emitted from the polarization beam splitter 12. The polarization beam splitter 12, the quarter-wave plate 13, the lens 14, the objective lens 15, and the cylindrical lens 17 constitute an optical unit.

As above, the light blocking unit 19 includes the plate-like member which is different from the housing member, and the light blocking portion formed on the plate-like member, for blocking light, and it is therefore possible to manufacture the light blocking unit 19 in a step independent of a step of manufacturing the housing member.

Figure 2:
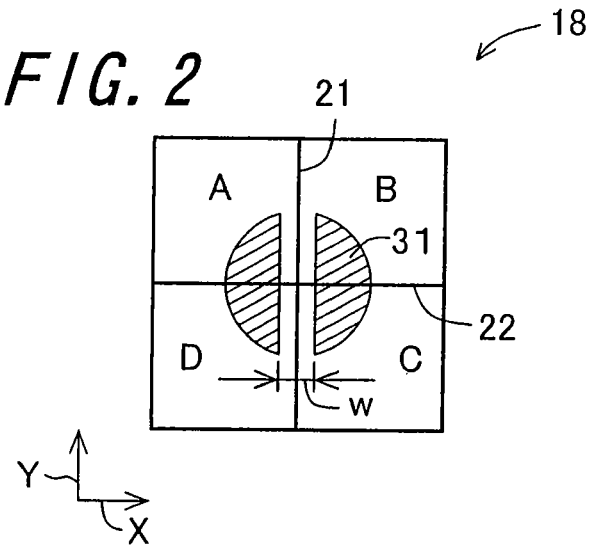
FIG. 2 is a view showing a schematic configuration of a light detector and a light beam-irradiated area thereon.

FIG. 2 is a view showing a schematic configuration of the light detector 18 and a light beam-irradiated area 31 thereon. The light detector 18 has the light receiving portion for receiving light which is partitioned into four divided regions A to D, by a Y-axis-wise boundary line, namely, a parting line 21, and an X-axis-wise boundary line, namely, a parting line 22, in X-Y coordinates. Light is received by the respective divided regions of the light receiving portion, and photoelectric output signals SA to SD are outputted for the respective divided regions in accordance with intensity of the light.

The light beam-irradiated area 31 indicates an area of light detector 18 which is irradiated with a light beam. The light beam emitted to the light detector 18 is a light beam which is emitted from the polarization beam splitter 12 and not blocked by the light blocking unit 19. No light beam is emitted to an area having a width "w" orthogonal to the parting line 21.

The respective divided regions A to D of the light receiving portion are each formed of a light receiving element. A position of the light detector 18 is adjusted so that the photoelectric output signals SA to SD outputted from the respective light receiving elements are equal to each other when the light beams equal in intensity are emitted to the respective light receiving elements in the light beam-irradiated area 31 on the light detector 18. In such a position as above, the light detector 18 is fixed with adhesive, for example, to a housing member.

As above, the light receiving portion is formed of a plurality of light receiving elements corresponding to the respective divided regions, with the result that the light receiving portion can by formed by joining the plurality of the light receiving elements.

Figure 3A:
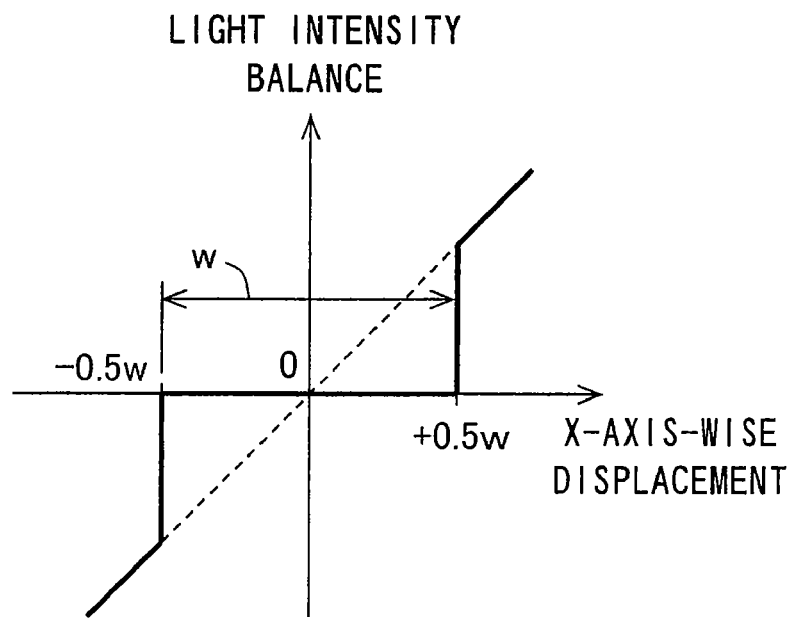
FIGS. 3A and 3B are graphs each showing a relation between displacement and a light intensity balance of the light detector.
Figure 3B:
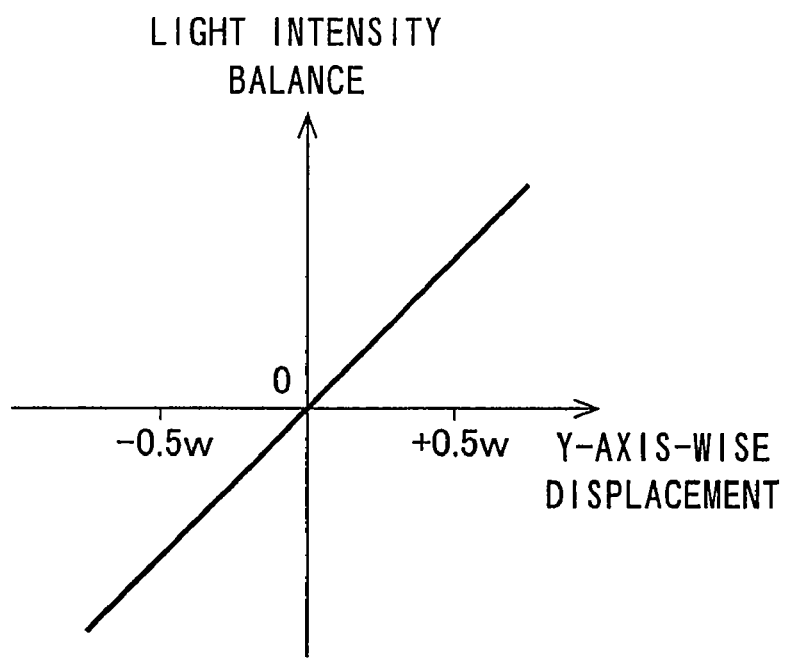

FIGS. 3A and 3B are graphs each showing a relation between displacement and a light intensity balance of the light detector 18. To be more specific, FIGS. 3A and 3B each show a relation between the displacement and the light intensity balance of the light detector 18 in the case where a light beam-irradiated area on the light detector 18 is equal to the light beam-irradiated area 31 shown in FIG. 2. The graph of FIG. 3A shows the light intensity balance Bx of the light detector 18 relative to the X-axis-wise displacement of the light detector 18. A horizontal axis is the X-axis-wise displacement while a vertical axis is the light intensity balance Bx. The light intensity balance Bx is determined by the expression (1) using the four photoelectric output signals SA to SD.

$$Bx=\{(SA+SD)-(SB+SC)\}/(SA+SB+SC+SD) \tag{1}$$

Since a part of the light beam emitted from the polarization beam splitter 12 is blocked by the light blocking unit 19 so that no light beam is emitted onto the parting line 21, there exists a range where the light intensity balance determined by the expression (1) is always zero relative to the X-axis-wise displacement of the light detector 18. The range runs from −0.5w to +0.5w, where "w" represents an X-axis-wise width of the light beam-irradiated range.

The X-axis-wise displacement out of the range of −0.5w to +0.5w is substantially proportional to the light intensity balance Bx. The light intensity balance Bx can be determined by the following expression where "r" represents a radius of the light beam emitted to the light detector 18, and "x" represents X-axis-wise displacement of the light detector 18.

$$Bx = \{(SA + SD) - (SB + SC)\}/(SA + SB + SC + SD)$$

$$= \{\pi r^2 \cdot \sin^{-1}(x/r)/90 + 2x \cdot (r^2 - x^2)^{1/2}\}/(\pi r^2)$$

The graph of FIG. 3B shows the light intensity balance By of the light detector 18 relative to the Y-axis-wise displacement of the light detector 18. A horizontal axis is the Y-axis-wise displacement while a vertical axis is the light intensity balance By. The light intensity balance By is determined by the expression (2) using the four photoelectric output signals SA to SD.

$$By = \{(SA+SB)-(SC+SD)\}/(SA+SB+SC+SD) \quad (2)$$

Because of no influence of the light blocking unit 19, the Y-axis-wise displacement of the light detector 18 is substantially proportional to the light intensity balance By. The following expression is satisfied where "y" represents the Y-axis-wise displacement of the light detector 18.

$$By = \{(SA + SD) - (SB + SC)\}/(SA + SB + SC + SD)$$

$$= \{\pi r^2 \cdot \sin^{-1}(y/r)/90 + 2y \cdot (r^2 - y^2)^{1/2}\}/(\pi r^2)$$

In this case, assuming that the radius of the light beam emitted to the light detector 18 is 30 μm and the X-axis-wise displacement of the light detector 18 is 5 μm, for example, a percentage of the light intensity balance By will be 21.1% when the light blocking unit 19 is not provided. The relation of the four photoelectric output signals represented by SA=SB=SC=SD is thus no longer satisfied, resulting in a failure to fall within a desired error range to be detected and causing a decrease in controllability.

When a part of the light beams emitted from the polarization beam splitter 12 are blocked by the light blocking unit 19 so that no light beams are emitted to a 12 μm-wide region ranging 6 μm on both sides of the parting line 21, for example, the percentage of the light intensity balance Bx will be 0%. Thus, the X-axis-wise controllability does not degrade with the displacement within the 12 μm-wide region. In other words, the change in the output of the light detector 18 moving within ±6 μm is 0%.

As above, the parting line 21 as the boundary line is a straight line, and the above predetermined area is defined by two sides parallel to the parting line 21, thus allowing for a decreased change of the output signal of the light detector in motion as long as the displacement of the light detector in a direction orthogonal to the boundary line of the light receiving portion falls within the predetermined range.

FIG. 4 is a view showing the second light beam-irradiated area 32 on the light detector 18. The second light beam-irradiated area 32 indicates an area of light detector 18 which is irradiated with a light beam. The light beam emitted to the light detector 18 is a light beam which is emitted from the polarization beam splitter 12 and not blocked by the light blocking unit 19. No light beam is emitted to an area having a width "w" orthogonal to the parting line 21 and an area having a width "h" orthogonal to the parting line 22.

Figure 5A:
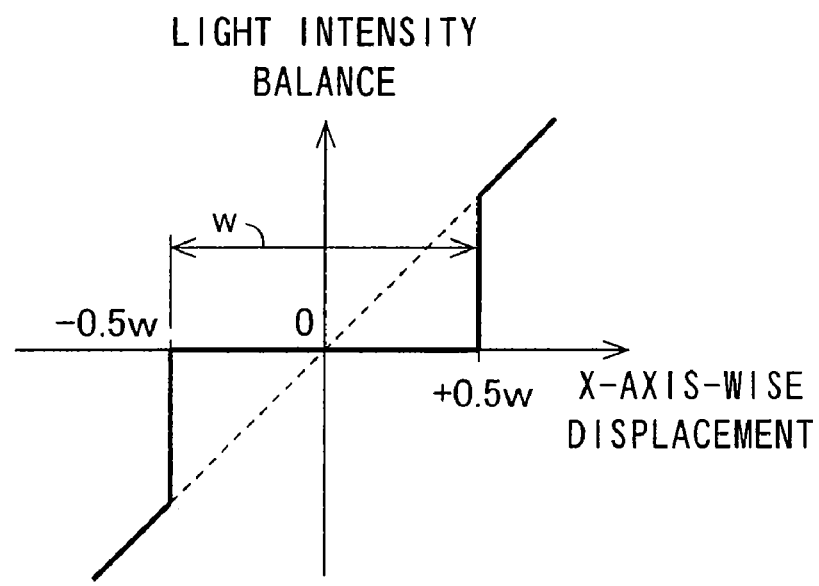
FIGS. 5A and 5B are graphs each showing a relation between displacement and a light intensity balance of the light detector.
Figure 5B:
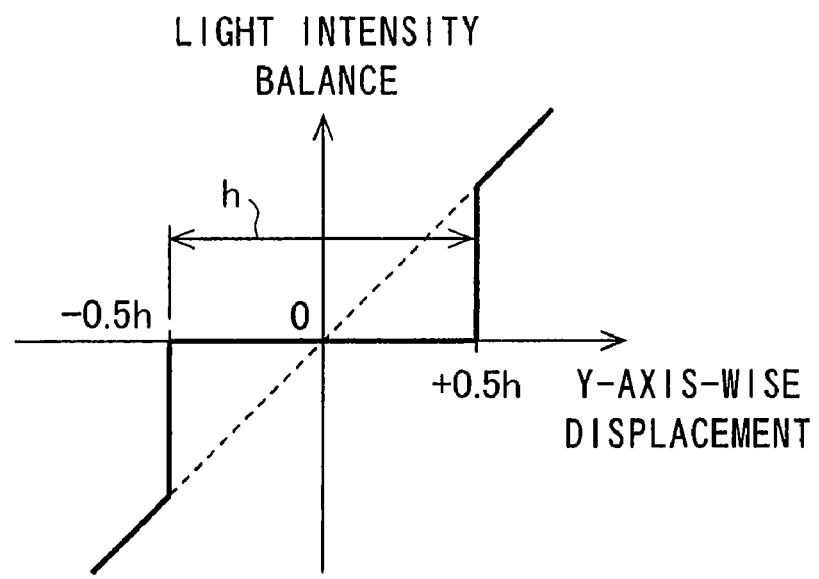

FIGS. 5A and 5B are graphs each showing a relation between displacement and a light intensity balance of the light detector 18. To be more specific, FIGS. 5A and 5B each show a relation between the displacement and the light intensity balance of the light detector 18 in the case where a light beam-irradiated area on the light detector 18 is equal to the second light beam-irradiated area 32 shown in FIG. 4. The graph of FIG. 5A shows the light intensity balance Bx of the light detector 18 relative to the X-axis-wise displacement of the light detector 18. The graph of FIG. 5A is the same as that of FIG. 3A and therefore, an explanation of FIG. 5A will be omitted.

The graph of FIG. 5B shows the light intensity balance By of the light detector 18 relative to the Y-axis-wise displacement of the light detector 18. A horizontal axis is the Y-axis-wise displacement while a vertical axis is the light intensity balance By. Since the second light beam-irradiated area 32 shown in FIG. 4 does not include the area having the width "h" orthogonal to the parting line 22 which area is irradiated with no light beams, the Y-axis-wise displacement of the light detector 18 satisfies the same relation as that of the X-axis-wise displacement of the light detector 18. That is to say, the light intensity balance By is always zero with the Y-axis-wise displacement falling in a range of −0.5 h to +0.5 h.

The light intensity balance By with the displacement out of the range of −0.5 h to +0.5 h satisfies the following expression.

$$By = \{(SA + SD) - (SB + SC)\}/(SA + SB + SC + SD)$$

$$= \{\pi r^2 \cdot \sin^{-1}(y/r)/90 + 2y \cdot (r^2 - y^2)^{1/2}\}/(\pi r^2)$$

For example, assuming that the radius of the light beam is 30 μm, and the light detector 18 moves 5 μm respectively in X-axis-wise and Y-axis-wise directions, the both percentages of the light intensity balance Bx and the light intensity balance By are zero, thus leading to no decrease in controllability.

As above, the boundary line includes at least two straight lines orthogonal to each other, and the above predetermined area is formed into a cross defined by two sides respectively parallel to the just-described straight lines orthogonal to each other, thus allowing for a decreased change of the output signal of the light detector in motion as long as the displacement of the light detector in either direction falls within the predetermined range.

Furthermore, the following expression is satisfied under the condition of δ<w/2:

$$\{\pi r^2 \cdot \sin^{-1}(\delta/r)/90 + 2\delta \cdot (r^2 - \delta^2)^{1/2}\}/(\pi r^2) = 0$$

where "r" represents a radius of the light beam which is converged on the light receiving portion by the polarization beam splitter 12, the quarter-wave plate 13, the lens 14, the objective lens 15, and the cylindrical lens 17; "δ" represents a distance between a center of the above light beam being converged and the boundary line; and "w" represents the minimum width orthogonal to the boundary line, of the above predetermined range.

Accordingly, the light intensity balance is maintained as long as the distance δ between the center of the light beam being converged and the boundary line, that is, the displacement of the light detector is less than a half of the width "w". It is therefore possible to prevent the controllability from degrading.

Figure 6:
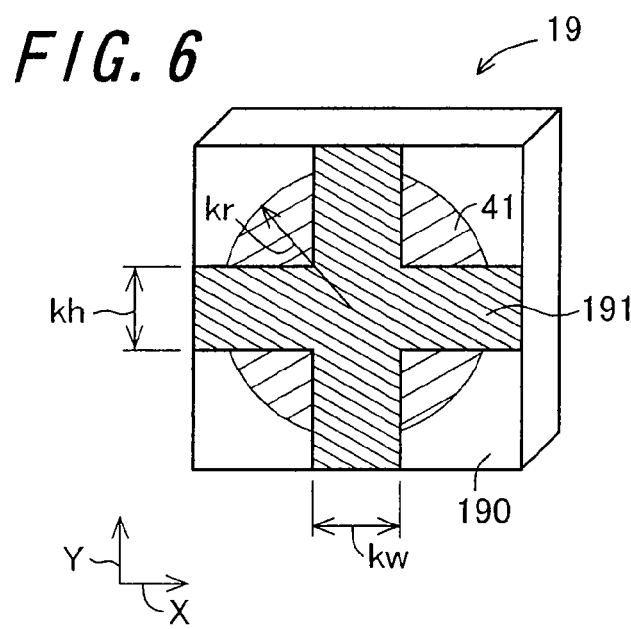
FIG. 6 is a view showing a light blocking portion formed on a light blocking unit with a light beam transmissive area which transmits a light beam.

FIG. 6 is a view showing a light blocking portion 191 formed on the light blocking unit 19 with a light beam transmissive area 41 which transmits a light beam. The light blocking unit 19 includes a plate-like member 190 which is different from the housing member, and the light blocking portion 191 formed on the plate-like member 190, for blocking light.

The light blocking portion 191 is, for example, formed into a cross composed of mutually joined rectangles, one of which rectangles is defined by two sides parallel to the Y axis and has a width Kw and another of which rectangles is defined by two sides parallel to the X axis and has a width Kh. The light beam transmissive area 41 indicates an area transmitting a light beam, on a surface of the light blocking unit 19 in which the light blocking portion 191 is formed.

Assume, for example, that the radius Kr of the light beam transmissive area 41 is 60 µm and that the X-axis-wise width and Y-axis-wise width of the light blocking portion 191 are both 24 µm. In this case, when the light beam emitted from the polarization beam splitter 12 decreases by half in radius upon being converged on the light detector 18, a 5 µm-shift of the light detector 18 results in the displacement which is half a width of that of the light detector 18, i.e., 6 µm or less, and the light intensity balance which is zero, thus leading to no decrease in the controllability.

As above, the laser element 11 emits the light beam, and the light detector 18 having the light receiving portion which is partitioned into at least two divided regions, for receiving the light beam emitted, outputs the output signals for the respective divided regions in accordance with intensity of the light received by the respective divided regions of the light receiving portion.

And by way of the polarization beam splitter 12, the quarter-wave plate 13, the lens 14, the objective lens 15, and the cylindrical lens 17, the light beam emitted from the light source is converged on the recording medium 16 on which information is to be recorded, and the light beam reflected by the recording medium 16 is converged on the light receiving portion in the light detector 18. Of the light beams being converged on the light receiving portion by way of the polarization beam splitter 12, the quarter-wave plate 13, the lens 14, the objective lens 15, and the cylindrical lens 17, the light beam is blocked by the light blocking unit 19 which light beam is converged in the predetermined range including at least a part of the boundary line formed by adjacent divided regions of the at least two divided regions.

Accordingly, the intensity of the light beam emitted to the respective divided regions of the light receiving portion does not change as long as the displacement of the light detector falls within the predetermined range, with the result that a change can be smaller in the output signal of the light detector in motion. That is to say, a region can be provided where the light intensity does not change even when the light detector moves, therefore allowing for higher tolerance to the shift of the light detector caused by a change in ambient temperature, physical impact, or the like matter, and allowing for higher reliability of the optical pickup apparatus.

Figure 7:
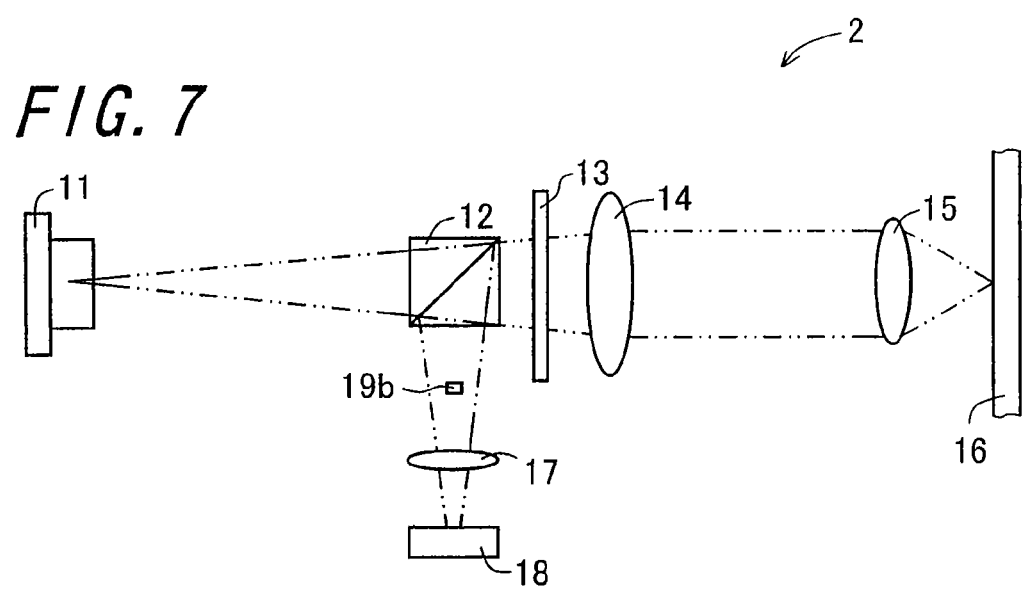
FIG. 7 is a view showing a configuration of an optical pickup apparatus according to a second embodiment of the invention.

FIG. 7 is a view showing a configuration of an optical pickup apparatus 2 according to a second embodiment of the invention. In the optical pickup apparatus 2, a light blocking unit 19b is provided instead of the light blocking unit 19 of the optical pickup apparatus 1 shown in FIG. 1. The light blocking unit 19b includes a protrusion formed integratedly with a housing member, and a light blocking portion formed in the protrusion, for blocking light.

Owing to the light blocking unit 19b including the protrusion integrated with the housing member, and the light blocking portion formed in the protrusion, for blocking light as above, there is no need to provide a plate-like member, thus allowing for a simpler configuration of the optical pickup apparatus.

Figure 8:
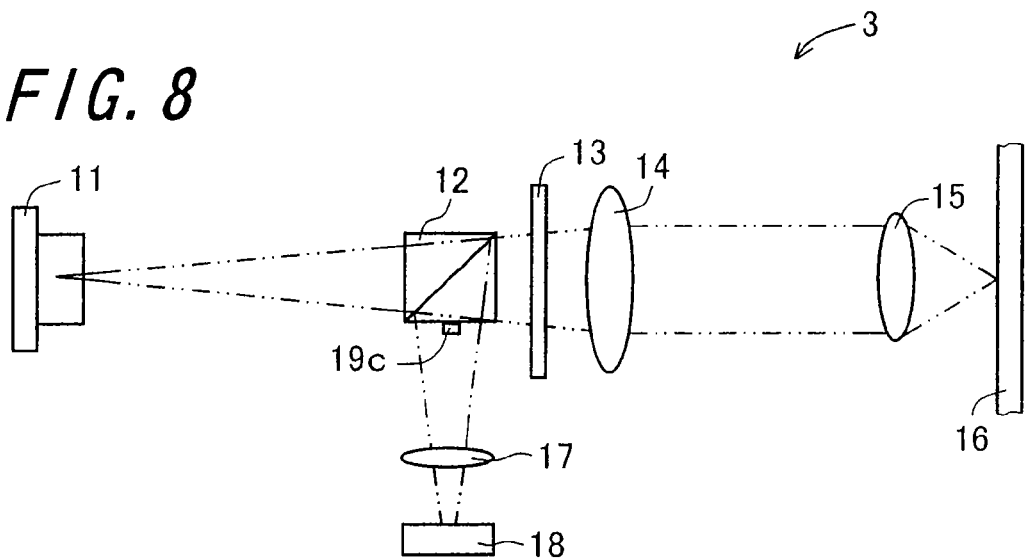
FIG. 8 is a view showing a configuration of an optical pickup apparatus according to a third embodiment of the invention.

FIG. 8 is a view showing a configuration of an optical pickup apparatus 3 according to a third embodiment of the invention. In the optical pickup apparatus 3, a light blocking unit 19c is provided instead of the light blocking unit 19 of the optical pickup apparatus 1 shown in FIG. 1. The light blocking unit 19c includes a light blocking portion which is formed on a positioning protrusion of housing member which supports the polarization beam splitter 12 at fixed position, for blocking light. The positioning protrusion is, for example, a protruding cross-shaped wall of the housing member.

As above, the housing member includes the positioning protrusion which supports the polarization beam splitter 12 at fixed position, and the light blocking unit 19c includes the light blocking portion formed on the positioning protrusion, for blocking light, with the result that there is no need to provide a plate-like member and that the protrusion can be removed which is integrated with the housing member to support the light blocking unit, thus allowing for a simpler configuration of the optical pickup apparatus.

Figure 9:
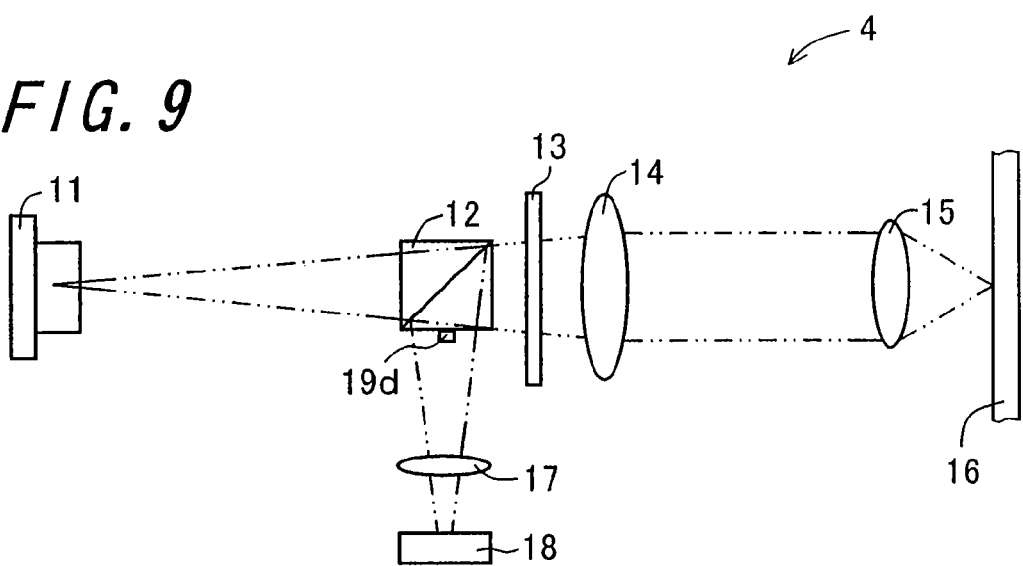
FIG. 9 is a view showing a configuration of an optical pickup apparatus according to a fourth embodiment of the invention.

FIG. 9 is a view showing a configuration of an optical pickup apparatus 4 according to a fourth embodiment of the invention. In the optical pickup apparatus 4, a light blocking unit 19d is provided instead of the light blocking unit 19 of the optical pickup apparatus 1 shown in FIG. 1. The light blocking unit 19d includes a light blocking portion formed in the polarization beam splitter 12, for blocking light. The light blocking portion of the light blocking unit 19d is formed of a vacuum-deposited metal film, for example.

Owing to the light blocking unit 19d including the light blocking portion formed in the polarization beam splitter 12, for blocking light as above, there is no need to provide a plate-like member, thus allowing for a simpler configuration of the optical pickup apparatus.

Figure 10:
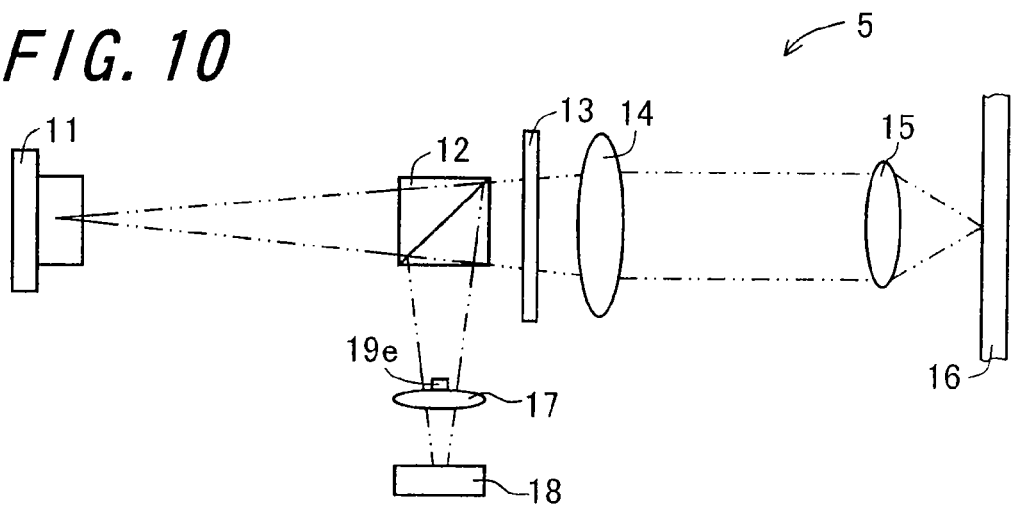
FIG. 10 is a view showing a configuration of an optical pickup apparatus according to a fifth embodiment of the invention.
Figure 11:
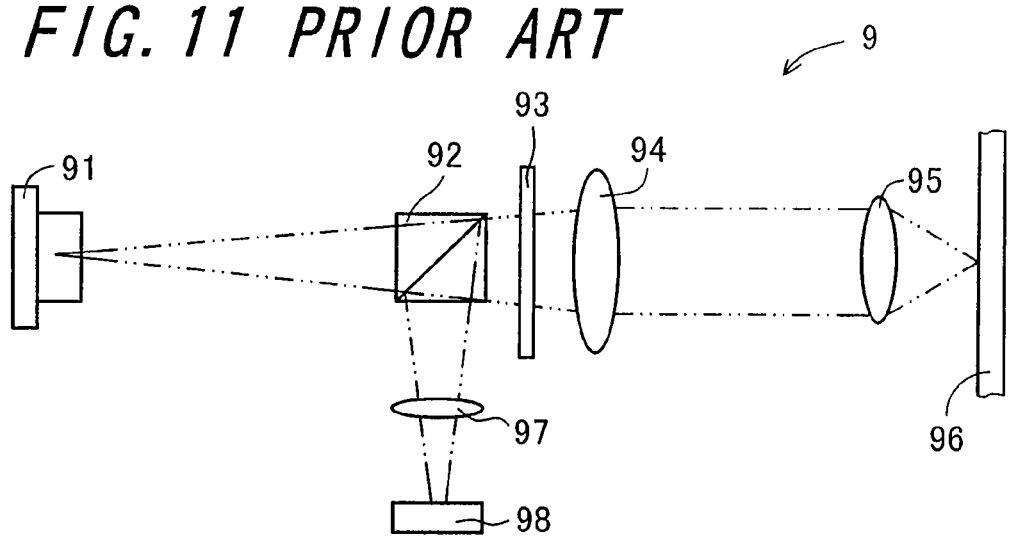
FIG. 11 is a view showing a configuration of an optical pickup apparatus according to the first related art.
Figure 12:
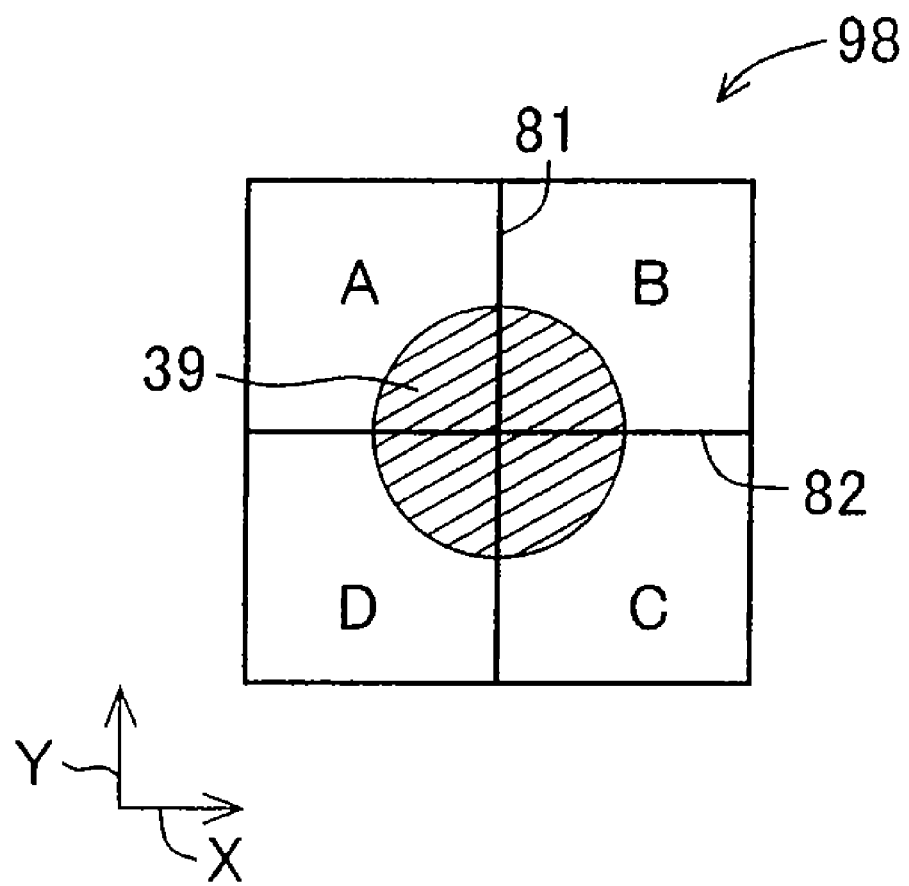
FIG. 12 is a view showing a light beam-irradiated area on a light detector contained in the optical pickup apparatus.
Figure 13A:
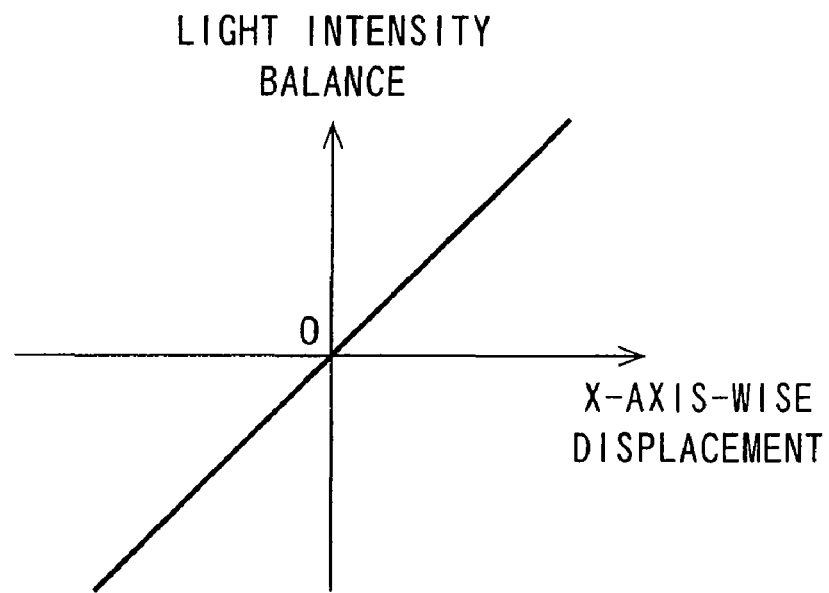
FIGS. 13A and 13B are graphs each showing a relation between displacement and a light intensity balance of the light detector.
Figure 13B:
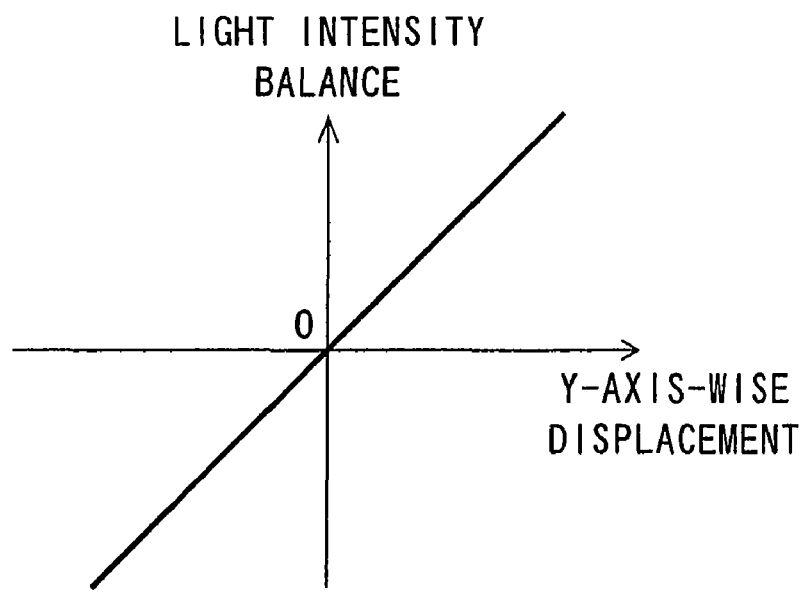

FIG. 10 is a view showing a configuration of an optical pickup apparatus 5 according to a fifth embodiment of the invention. In the optical pickup apparatus 5, a light blocking unit 19e is provided instead of the light blocking unit 19 of the optical pickup apparatus 1 shown in FIG. 1. The light blocking unit 19e includes a light blocking portion formed in the cylindrical lens 17, for blocking light. The light blocking portion of the light blocking unit 19e is in form of a vacuum-deposited metal film, for example.

Owing to the light blocking unit 19e including the light blocking portion formed in the cylindrical lens 17, for blocking light as above, there is no need to provide a plate-like member, thus allowing for a simpler configuration of the optical pickup apparatus.

Furthermore, the light blocking portions of the light blocking unit 19d and the light blocking unit 19e can be each formed into an accurate shape and size since the light blocking portions are each in form of, for example, a vacuum-deposited metal film.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus comprising:
    a light source for emitting a light beam;
    a light receiving unit having a light receiving portion which is partitioned into at least two divided regions, for receiving the light beam emitted, the light receiving unit outputting an output signal of each of the regions in accordance with intensity of the light beam received by the respective divided regions of the light receiving portion;

an optical unit for converging the light beam emitted from the light source onto a recording medium on which information is to be recorded, the optical unit further converging a light beam reflected by the recording medium onto the light receiving portion of the light receiving unit;

a light blocking unit for blocking, of the light beam being converged on the light receiving portion through the optical unit, a light beam being converged in a predetermined rage including at lease a part of a boundary line formed by adjacent regions of the at least two divided regions; and a light beam splitting unit for splitting a light beam reflected by a recording medium, wherein the light blocking unit comprises a light blocking portion formed in the light beam splitting unit, for blocking light.

2. The optical apparatus of claim 1, wherein the light receiving portion is formed of a plurality of light receiving elements corresponding to the respective divided regions.

3. The optical pickup apparatus of claim 1, wherein the boundary line is a straight line, and the predetermined range is defined by two sides parallel to the boundary line.

4. The optical pickup apparatus of claim 1, wherein the boundary line includes at least two straight lines orthogonal to each other, and the predetermined range has a cross shape defined by two sides parallel to the straight lines orthogonal to each other.

5. An optical pickup apparatus comprising:

a light source for emitting a light beam;

a light receiving unit having a light receiving portion which is partitioned into at least two divided regions, for receiving the light beam emitted, the light receiving unit outputting an output signal of each of the regions in accordance with intensity of the light beam received by the respective divided regions of the light receiving portion;

an optical unit for converging the light beam emitted from the light source onto a recording medium on which information is to be recorded, the optical unit further converging a light beam reflected by the recording medium onto the light receiving portion of the light receiving unit; and a light blocking unit for blocking, of the light beam being converged on the light receiving portion through the optical unit, a light beam being converged in a predetermined rage including at least a part of a boundary line formed by adjacent regions of the at least two divided regions, wherein the following expression is satisfied under a condition of $\delta<w/2$:

$$\{\pi r^2 \cdot \sin^{-1}(\delta/r)/90 + 2\delta \cdot (r^2-\delta^2)^{1/2}\}/(\pi r^2) = 0$$

where "r" represents a radius of the light beam being converged on the light receiving portion by the optical unit, "$\delta$" represents a distance between a center of the light beam being converged and the boundary line, and "w" represents a minimum width orthogonal to the boundary line, of the predetermined range.

6. An optical pickup apparatus comprising:

a light source for emitting a light beam;

a light receiving unit having a light receiving portion which is partitioned into at least two divided regions, for receiving the light beam emitted, the light receiving unit outputting an output signal of each of the regions in accordance with intensity of the light beam received by the respective divided regions of the light receiving portion;

an optical unit for converging the light beam emitted from the light source onto a recording medium on which information is to be recorded, the optical unit further converging a light beam reflected by the recording medium onto the light receiving portion of the light receiving unit; and a light blocking unit for blocking, of the light beam being converged on the light receiving portion through the optical unit, a light beam being converged in a predetermined rage including at least apart of a boundary line formed by adjacent regions of the at least two divided regions, wherein the optical unit comprises a cylindrical lens, and the light blocking unit comprises a light blocking portion formed in the cylindrical lens, for blocking light.

7. The optical pick apparatus of claim 6, wherein the light receiving portion is formed of a plurality of light receiving elements corresponding to the respective divided regions.

8. The optical pickup apparatus of claim 6, wherein the boundary line is a straight line, and the predetermined range is defined by two sides parallel to the boundary line.

9. The optical pickup apparatus of claim 6, wherein the boundary line includes at least two straight lines orthogonal to each other, and the predetermined range has a cross shape defined by two sides parallel to the straight lines orthogonal to each other.

10. The optical pickup apparatus of claim 6, wherein the following expression is satisfied under a condition of $\delta<w/2$:

$$\{\pi r^2 \cdot \sin^{-1}(\delta/r)/90 + 2\delta \cdot (r^2-\delta^2)^{1/2}\}/(\pi r^2) = 0$$

where "r" represents a radius of the light beam being converged on the light receiving portion by the optical unit, "$\delta$" represents a distance between a center of the light beam being converged and the boundary line, and "w" represents a minimum width orthogonal to the boundary line, of the predetermined range.

* * * * *